US012660743B2

(12) United States Patent
Black

(10) Patent No.: US 12,660,743 B2
(45) Date of Patent: Jun. 23, 2026

(54) SEED SPREADING DEVICE FOR USE WITH COMBINE HARVESTING EQUIPMENT

(71) Applicant: N.S. Farms LLC, Charles City, VA (US)

(72) Inventor: Aaron L. Black, Providence Forge, VA (US)

(73) Assignee: N.S. Farms LLC, Charles City, VA (US)

( * ) Notice: Subject to any disclaimer, the term of this patent is extended or adjusted under 35 U.S.C. 154(b) by 459 days.

(21) Appl. No.: 18/315,655

(22) Filed: May 11, 2023

(65) Prior Publication Data

US 2023/0380332 A1     Nov. 30, 2023

Related U.S. Application Data

(63) Continuation of application No. PCT/US2023/021805, filed on May 11, 2023.

(60) Provisional application No. 63/345,259, filed on May 24, 2022.

(51) Int. Cl.
| | |
|---|---|
| *A01C 7/08* | (2006.01) |
| *A01B 79/02* | (2006.01) |
| *A01C 7/10* | (2006.01) |
| *A01C 7/20* | (2006.01) |
| *A01C 19/02* | (2006.01) |

(52) U.S. Cl.
CPC .............. *A01C 7/085* (2013.01); *A01B 79/02* (2013.01); *A01C 7/102* (2013.01); *A01C 7/206* (2013.01); *A01C 19/02* (2013.01)

(58) Field of Classification Search
CPC .. A01C 7/085; A01C 7/08; A01C 7/00; A01C 7/206; A01C 7/20; A01C 19/02; A01C 19/00; A01B 79/02; A01B 79/00
See application file for complete search history.

(56) References Cited

U.S. PATENT DOCUMENTS

| | | | | | |
|---|---|---|---|---|---|
| 4,078,626 | A | * | 3/1978 | Weichel | ................. A01D 67/00 |
| | | | | | 111/131 |
| 2014/0076218 | A1 | | 3/2014 | Liu | |
| 2015/0094916 | A1 | | 4/2015 | Bauerer | |

(Continued)

OTHER PUBLICATIONS

ISA/US; International Search Report and Written Opinion for International Patent Application No. PCT/US2023/021805, mailed Sep. 19, 2023, 12 pages.

(Continued)

*Primary Examiner* — Christopher J. Novosad
(74) *Attorney, Agent, or Firm* — NK Patent Law

(57) ABSTRACT
A seed spreading device for use with a combine harvester that has a residue distribution system which has a hopper enclosure, metering device, motor, and a guide tube with an end in communication with a residue distribution system. A metering device has a first opening and second opening with a delivery feeder disposed between the openings. Seeds in the hopper enclosure enter the first opening of the metering device through an aperture in the hopper enclosure. A motor is operatively connected to the delivery feeder which moves seeds from the first opening to the second opening of the metering device into a guide tube disposed proximate thereto. The guide tube delivers seed from the metering device into the residue distribution system of the combine harvester to be deposited during a harvesting process.

16 Claims, 10 Drawing Sheets

(56)         References Cited

U.S. PATENT DOCUMENTS

| | | | |
|---|---|---|---|
| 2016/0212931 | A1 | 7/2016 | Henry |
| 2016/0330901 | A1 | 11/2016 | Arnold |
| 2017/0215339 | A1 | 8/2017 | Jongmans |

OTHER PUBLICATIONS

WIPO; International Preliminary Report on Patentability for International Patent Application No. PCT/US2023/021805, dated Nov. 7, 2024, 9 pages.

* cited by examiner

SEED SPREADING DEVICE FOR USE WITH COMBINE HARVESTING EQUIPMENT

CROSS-REFERENCE TO RELATED APPLICATIONS

This application is a continuation of PCT Patent Application No. PCT/US2023/021805 entitled "SEED SPREADING DEVICE FOR USE WITH COMBINE HARVESTING EQUIPMENT," which was filed on May 11, 2023, which claims benefit of and priority to U.S. Provisional Patent Application No. 63/345,259 entitled "SEED SPREADING DEVICE FOR USE WITH COMBINE HARVESTING EQUIPMENT", which was filed on May 24, 2022, the entire contents of all which are hereby incorporated by reference in their entireties.

TECHNICAL FIELD

The present disclosure relates to the field of seed spreading devices, and in particular to seed spreading devices for use with crop residue distribution systems on combine harvesting equipment.

BACKGROUND

The use of cover crops has long been recognized as beneficial for agricultural purposes. In particular, it is commonly recognized that cover crops help manage soil erosion, soil fertility, soil quality, water, weeds, pests, diseases, biodiversity, and wildlife. Indeed, cover crops often help provide higher yields for cash crops; optimize soil health through nutrients and organic matter provided by continuous live root systems; increase soil microbial abundance, activity, and diversity; and provide the ability to plant nitrogen scavenging or producing crops. To take advantage of these benefits, cover crop seeds are generally broadcast either shortly before or after the harvest of a cash crop in all agricultural settings. While cover crop seeds can be broadcast in many ways, including even using an airplane or helicopter, cover crop seed is generally broadcast using a standard broadcast spreader pulled behind a tractor after harvesting is complete.

During harvesting, combine harvester machines (often referred to as just "combines") are generally utilized. Combines are versatile machines that have become one of the most economically important devices on a farm since their inception. During use, a header generally cuts a plant and moves it into the machine to be processed so the valuable portions can be collected and residue can be disposed of. Generally, this residue is often disposed of by being windrowed or distributed behind the combine by its crop residue distribution system. Crop residue distribution systems generally include, internally or as attachments to a combine, straw spreader, straw chopper, and/or chaff spreader equipment to provide for more even distribution of crop residue behind a combine. All residue is generally applied back to the field from which the cash crop is harvested by the crop residue distribution system.

Accordingly, it would be beneficial if there was a device which could be used with existing or additional crop residue distribution portions of a combine, at the time of harvest, to broadcast cover crop seed. In particular, it would be beneficial to have a cover crop seed spreading device for use with combines that is affordable, simple to make, install, and use, and reduces the need to use extra fuel, time, money, and effort to separately spread cover crop seed.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In view of the above, one purpose of the present invention is to provide a seed spreading device for use with residue distribution systems of a combine that, in one or more embodiments, is affordable, simple, easy to install and use, provides a savings in cost, time, fuel, and effort, allows for spreading at a variable rate, is easy to modify to match desires or needs, and integrates with combine GPS, computer, and control systems. Moreover, such a device, in certain aspects, helps establish cover crops and achieve their benefit without requiring one to separately spread cover crop seed before or after harvest of a cash crop.

According to one or more embodiments, a seed spreading device generally comprises a hopper enclosure (also called a "hopper" herein), motor, metering device, and a guide tube so that because of mechanical rotation of the motor, the metering device draws material, like seed, from the hopper enclosure for metered delivery to the guide tube to be dispensed into the residue distribution system to be broadcast with the dispersed straw and chaff.

According to embodiments, the seed spreading device comprises a hydraulic drive motor in mechanical communication with a clutch and metering device through transmission linkages, a hopper enclosure and control gate affixed to opposite sides of a metering device, and a guide tube with a collector affixed to one end disposed below the control gate and another end disposed at or near the inlet for the residue distribution system of the combine.

In embodiments, the hydraulic drive motor of the device is parasitic, tying into an existing hydraulic system for the combine, such as that for the header reel, separator drive, or any other mechanism related to harvesting. In one aspect, tying into the combine header reel or separator drive hydraulic system causes the motor to turn, and accordingly material, like seed, to be broadcast, only when the header reel or separator is engaged, preventing the waste of material or application when the combine is not engaged in harvesting. In another aspect, tying into a combine hydraulic system may allow variable speed control for the hydraulic drive motor based on the existing control mechanisms. Accordingly, variable speed control for the hydraulic drive motor of the device may result from the variable speed control, e.g., flow control valve, for the header reel or separator drive. In one variation on the above embodiment, flow control is provided by a hydraulic flow control valve within the existing hydraulic system.

While the above variations describe use of an existing hydraulic system, or portion thereof, relating to the header reel, it is also understood that the hydraulic motor may be tied into a separate hydraulic system, or portion thereof, and/or have its own flow control mechanisms, even potentially including a variable displacement hydraulic pump—thereby allowing separate control of the motor. Moreover, it is also understood that the hydraulic flow control valve may be activated through any means, such as manually operated or electrically actuated valves. Lastly, in certain embodiments, a direction control valve may be utilized, particularly if the hydraulic drive motor is bi-rotational, and such movement might be useful to the operation of one or more embodiments of the device. In embodiments, motion generated by the hydraulic drive motor is communicated to the metering device through transmission linkages and the clutch, such as an electric drive clutch.

In embodiments, a clutch is also included to selectively allow transmission of motion from the motor through transmission linkages to the metering device through additional transmission linkages. In particular, the clutch selectively engages and disengages a connection between the motion of the motor, communicated through transmission linkages between the motor and the clutch, and the motion of additional transmission linkages between the clutch and the metering device in at least one embodiment. As this alignment is selective, the clutch, in at least one state, does not allow a connection between transmission linkages from the motor and to the metering device in at least one embodiment. For example, if an electric drive clutch is supplied with power, the electric drive clutch allows the hydraulic drive motor to run and motion to be transmitted through the transmission linkages therebetween but does not connect to allow dependent motion to be transmitted to a metering device. However, that same example clutch, when power is not supplied thereto, may connect and cause motion in the transmission linkages to the metering device based on motion in the linkages from the motor. Accordingly, the clutch can allow the motor to be actively in motion without material being consequently broadcast in various embodiments. Thereby, the seed spreading device can be effectively switched off even when the combine header reel or separator is engaged. Such an arrangement allows for the use of the combine without simultaneous use of the seed spreading device, even if the motor is tied into an existing hydraulic system in use.

In various embodiments, a clutch is operated, such as by being supplied power, through a controller, such as by a switch in the cab of a combine. In certain embodiments, the clutch controller may allow for a simple on/off arrangement or may allow for an alternative arrangement, such as an on/off/auto arrangement, where the auto setting may be dependent upon another sensor or switch. Thereby, a user might be able to turn the clutch on and off, in certain embodiments, or allow the clutch to be turned on based on the condition of a sensor, such as one tied to the height of the header, or a switch, such as one tied to the hydraulic pressure to the header. In embodiments, the clutch may be an electric drive clutch or any clutch device, such as a mechanical clutch with mechanical controls. Indeed, the clutch can be another device utilized to control motion supplied to the metering device. Accordingly, in various embodiments, it is understood that the metering device itself might incorporate, internally or as an attachment, a device which only selectively utilizes motion transmitted thereto and that such device. Moreover, in various embodiments, an electric drive clutch or any other clutch or device, so utilized, might also be capable of regulating the speed at which the metering device operates. Moreover, it is understood that the transmission linkages may take the form of a chain, belt, rope, or the like.

In embodiments, a metering device is included which is affixed at one end to a hopper enclosure and at another to a control gate. The hopper enclosure provides storage for a volume of seeds intended to be broadcast in embodiments. In various embodiments, the hopper enclosure may be any shape, size, or capacity which allows for the storage of a volume of seed and the attachment/integration of the device with a particular combine. Indeed, in various embodiments, it is foreseen that the hopper enclosure may be removably attached to the metering device and/or the combine itself so that it can be replaced. The hopper enclosure, however, will generally be a hollow enclosure having an aperture, or opening, to allow seed to be deposited therein and another aperture, or opening, to an open end of the metering device can be attached.

In one embodiment, the metering device may comprise a housing with at least two openings, one to attach to the hopper, and another attached to or integrated with a control gate, and a fluted feed roller delivery feeder between the two openings. The delivery feeder also may have a drive shaft that connects to transmission linkages, such as by a sprocket engaging a roller chain. In such an embodiment, as the transmission linkages spin the drive shaft, the delivery feeder roller moves a metered amount of seed from the hopper side opening to the control gate side opening where the seed may pass into a collector and guide tube. The control gate may narrow or expand the size of the passage or opening between the metering device and the collector and/or guide tube, thereby providing the ability to control the rate at which seed is broadcast. In one embodiment, the control gate is a simple slide mechanism which slides or pivots across an opening in the metering device housing.

In addition to the control gate, the dimensions of the metering device housing and delivery feeder and the speed at which the delivery feeder is operated, such as the fluted feed roller shaft being rotated, also may control the rate at which seed is broadcast in embodiments. In various embodiments, the sprocket and shaft are rotated by the transmission linkages between the metering device and the clutch. Thereby, the rate of seed broadcast may be determined by a variety of factors including the speed of the motor creating motion in the transmission linkages, any further regulation by the clutch or metering device itself, the dimensions of the elements of the metering device, and the control gate in various embodiments. However, it is generally understood that the speed of the motor, any regulation by the clutch, and the setting of the control gate may normally be the only factors generally altered to control the rate in embodiments.

In various embodiments, as material, like seed, flows out the metering device and through the control gate it enters a collector which directs it to a guide tube. In certain aspects the collector may be made of a flexible material and disposed below and/or press fit to the end of the metering device near the control gate. Thereby, the collector may allow for friction, vibration and movement between the guide tube and the metering device in certain aspects. However, in other embodiments the guide tube may be directly connected to the metering device to accept seed flowing therefrom. Indeed, in at least one embodiment, the guide tube may be integrally formed with the metering device. Moreover, while the control gate is discussed as being disposed below or integrated with the metering device, it is also foreseen that the control gate may be disposed as part of the collector and/or guide tube, in certain embodiments.

Once in the guide tube, seed is directed to the residue distribution system, so that seed is distributed and broadcast with the residue from the harvesting process, such as straw and chaff. In embodiments, gravity pulls seed through the guide tube, from a first end adjacent the metering device to the second end in communication with the residue distribution system of the combine. In certain embodiments, the seed spreading device may also include one or more conveyor devices, in communication with the guide tube, that assist or cause material in the guide tube to flow from the first end to the second end. In embodiments, the guide tube may have a port in communication with a fan, pump, or container of compressed fluid which injects fluid—gas or liquid—into the guide tube to force material through the guide tube. For example, embodiments of the device include a fan in communication with the guide tube that blows seed deposited from the metering device through the guide tube into the residue distribution system. In embodiments, the conveyor device is operated by a controller that also operates one or more of the motor, clutch, and control gate.

Thereafter, seed may be deposited from the guide tube to enter the straw spreader or chopper or chaff spreader, being dispersed through such systems, in various embodiments. In certain embodiments, seed may be deposited from the guide tube at a location after certain elements of the residue distribution system, such as after the straw spreader or chopper or chaff spreader so as to be distributed with residue exiting such elements. In various embodiments, the elements of the residue distribution system can be integrated with the combine, such as part of the original equipment, or attachments to the combine, such as after-market equipment. In certain aspects, the seed, no matter where in relation to the residue distribution system it is deposited, is exited from the combine with the residue to be broadcast and spread in a harvested field.

It is understood that all of the aforementioned elements of the seed spreader device might be attached to various portions of a combine in any manner. In an example embodiment, a frame might be welded onto the exterior of a combine to support one or more of the elements mentioned. In addition, elements of the seed spreader device might be removably attached to that frame so that they may be replaced, as needed in embodiments. Moreover, elements of the seed spreader device may be removably attached to the combine itself as needed in embodiments.

In additional embodiments, the device might also include a GPS system which receives a GPS signal to track and record seeded areas. The GPS system might be controlled by the same controller as the clutch, motor, or control gate, so that when the controller operates portions of the device to spread material, the GPS records motion and can display that recorded data back to a user, such as by highlighting areas on a map. Accordingly, the seed spreading device might both broadcast seed and record where seed has been broadcast.

In one embodiment of use, a user places seed for a desired cover crop in the hopper, inputs any desired data to be recorded into the GPS system, switches the clutch to an on or auto setting, and begin harvesting while the seed is deposited from the residue distribution system. In an embodiment, harvesting occurs when the header is placed at an appropriate harvest position and the reel is engaged to spin or separator is engaged. In certain embodiments, as the reel is engaged to spin, the hydraulic system drives a hydraulic drive motor of the seed spreading device to drive the metering device and deposit the seed. As the hopper empties, more seed can be added. In the earlier mentioned embodiment of use, if the controller (or the motor or clutch) is placed in an auto setting, seed may only be spread during times when the header is lowered to a harvest position. However, if the controller (or the motor or clutch) is placed in an on setting and the header is engaged, seed flow may be continuous (as long as the hydraulic system is engaged to drive the motor) until switched to an off position, regardless of the header position. In a particular embodiment, the device may be operated based information from the GPS system-such as when an automatic setting is activated.

Thereby, the device may be operated based on the position of the combine relative to a defined coverage area.

According to other embodiments, the seed spreading device comprises an electric drive motor in mechanical communication with metering device, a hopper and control gate affixed to opposite sides of a metering device, and a guide tube with a collector affixed to one end disposed below the control gate and another end disposed at or near the inlet for the residue distribution system of the combine harvester. In various embodiments, the electronic drive motor may have a speed that is variable through a control and may provide rotation to the shaft of the metering device directly or through one or more transmission linkages. In at least one embodiment, the electric motor may be integrated with the metering device reducing or removing the use of certain transmission linkages. Thereby, the whole seed spreader device may be more compact and easier to install. However, in at least one embodiment the electric motor may be separate from the metering device, so that it drives the metering device through one or more transmission linkages. Thereby, the discrete parts of the seed spreader may be easier to access, replace, and maintain.

In certain embodiments, the seed spreading device may not have a clutch, particularly if the electric drive motor is variable. While the use of the clutch provides a layer of control over the seed spreading device, similar control may be achievable in the seed spreading device without a clutch, if the motor can be switched on and off and speed varied at will according to control setting, particularly control settings not shared by any other elements or systems of the combine. In various embodiments, control of the electric drive motor may be tied to other systems, however. For example, the electric drive motor may not turn on and operate at a pre-set speed until the header is lowered to a certain position, as indicated by a sensor. In a further example, the speed of an electric drive motor may be tied to a sensor reporting the speed of the combine itself. Thereby, operation of the electric drive motor may be tied to systems to automate such operation and provide easier use. The speed of the motor and its operation may be through one or more of the controller, Bus Communication Unit (such as those associated with ISO or CAN Bus), a connected virtual terminal, or any combination of these systems.

In a further embodiment, the GPS system, or a computing system having a GPS component, may be utilized to control operation and speed of the seed spreading device. Indeed, in at least one embodiment, the user may utilize the GPS system to define the bounds of a field in which seed is to be spread and the GPS system may activate the seed spreading device when such a boundary is crossed. Moreover, control through GPS system may be provided to a device by utilizing a GPS system to control a motor, clutch, and/or control gate. Further, in addition to turning the seed spreading device on and off, the GPS system, or a computing system having a GPS component, may also be utilized to determine ground speed and change the speed of the seed dispersal, such as by changing the speed of the motor. Indeed, in embodiments where the hydraulic motor is controllable through its own flow control valve the valve may be actuated based on data acquired through the GPS system so that operation of the motor is variable and controlled based on data from the GPS system.

In additional embodiments, the control gate may or may not be included or necessary, regardless of the type of motor or presence of the clutch. The control gate provides a layer of control to the seed spreading device. However, such control may also be provided by the variable rate of the motor and thereby the metering device in certain embodiments. However, in embodiments having a control gate, such a gate may be manually set or electronically actuated, such as by a dial and/or a switch. Moreover, the seed spreading device may have one or more sensors to determine the presence of seed in elements of the device, the rate of seed moving through a system or a motor's rotation and/or the rate of the metering device's operation. All sensors and controls described herein may be electric and all information and settings relevant to the elements of the system may be recorded and controlled by a controller, virtual terminal, or other computer system integrated or separate from those of the combine in embodiments. Thereby, the functioning of the system may be further automated and more intricately controlled than by just using switches and dials. Further, the device may incorporate gauges relating to the rates of seed flow or rotation of a motor or metering device portion which may or may not be electric in embodiments to verify correct operation of and provide feedback regarding the seed spreading device.

BRIEF DESCRIPTION OF THE DRAWINGS

The foregoing, as well as the following Detailed Description, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
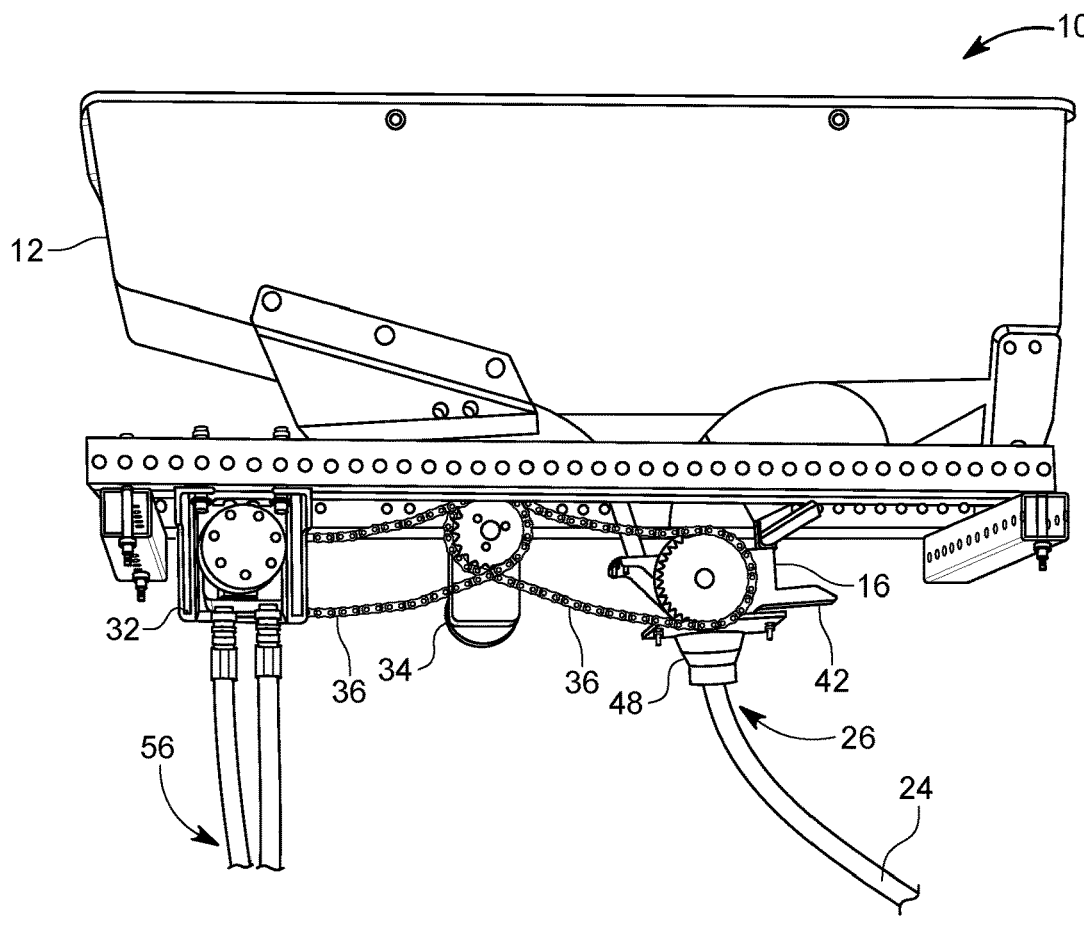
FIG. 1 illustrates a side view of a seed spreading device according to one or more embodiments that utilizes a hydraulic motor and a clutch.

The following description and figures are illustrative and are not to be construed as limiting. Numerous specific details are described to provide a thorough understanding of the disclosure. In certain instances, however, well-known or conventional details are not described in order to avoid obscuring the description. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way.

Alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure.

Device Generally

As seen in FIGS. 1-4, a seed spreading device 10 generally comprises a hopper enclosure 12 (hereinafter called a "hopper"), a metering device 16, a guide tube 24, and a motor 32 configured so that because of mechanical rotation of the motor 32, the metering device 16 draws seed from the hopper 12 for metered delivery to the guide tube 24 to be dispensed into the residue distribution system 52 of a combine 50 so it is broadcast with the dispersed straw and chaff. Use of the device 10 allows for seed to be broadcast simultaneously with the harvesting process and utilizing the residue distribution system 52 of a combine 50.

A residue distribution system 52 of a combine 50 commonly utilizes impellers, blades and/or blowers to distribute straw, chaff, and/or other residue. All or portions of the residue distribution system 52 may be part of a combine's original manufacture or added later (such as being an "after-market" addition). Moreover, all or portions of the residue distribution system 52 may be exposed, as in FIG. 3 or enclosed, as in FIG. 4 within a housing of the residue distribution system 52 and/or combine 50.

Thereby, in certain aspects the seed spreading device 10 allows for a cover crop to be planted without the duplication of time, effort, and cost of separately broadcasting seed for that cover crop before or after harvesting. Moreover, in certain aspects the seed spreading device 10 more efficiently broadcasts cover crop seed due to the use of an already existing residue distribution system 52 for a combine 50, without requiring the use of additional separate devices or trips over a harvested area to spread such seed. Thereby, the device 10 in certain aspects is simpler and reduces the likelihood of problems or issues by using already existing systems of a combine 50, rather than additional systems for its purpose. Indeed, in various embodiments the device 10 may use one or more of a combine's electrical system, hydraulic system 56, and a residue distribution system 52 to broadcast seed.

As shown in FIG. 1, one embodiment of the device 10 comprises a hydraulic drive motor 32 in mechanical communication with a clutch 34 and metering device 16 through transmission linkages 36, a hopper 12 and control gate 42 affixed to opposite sides of the metering device 16, and a guide tube 24. The guide tube 24 has a collector 48 affixed to one end 26 thereof and disposed below the control gate 42 in embodiments. The guide tube also has another end 28 disposed at or near an inlet to the residue distribution system 52 of the combine 50, as in FIGS. 3 and 4. Thereby, such an embodiment might utilize both an existing hydraulic system 56 and the residue distribution system 52 of the combine 50 to broadcast seed.

In use, a type of combine 50 is set to be used for harvesting causing a hydraulic system 56 to be engaged in certain embodiments. In one embodiment, the motor 32 of the device 10 is tied into that engaged hydraulic system 56 and configured to generate rotational motion when that hydraulic system 56 is engaged. In a specific embodiment, the engaged hydraulic system 56 includes a flow control valve which controls the speed of the motor 32. In at least one embodiment, the rotational motion generated by the motor 32 is communicated through a first set of transmission linkages 36, such as a chain, to a clutch 34, such as an electric drive clutch, to which the first set of transmission linkages 36 is also connected. The clutch 34, depending upon the settings thereof, selectively engages a connection between that first set of transmission linkages 36 and a second set of transmission linkages 36 which is connected to both the clutch 34 and the metering device 16.

In specific embodiments, the presence or absence of electricity provided to the clutch 34 may control whether the clutch 34 allows motion in the first set of transmission linkages 36 to generate motion in the second set of transmission linkages 36. Indeed, in an embodiment of a system like that shown in FIG. 10, the presence or absence of electricity provided to the clutch 34 may depend upon a controller 40, such as a switch. In embodiments, the controller 40 can be manually turned on and off or can also allow another condition to set the controller 40 on or off, such as the activation of a sensor or switch for another portion or the combine's systems. For example, the controller 40 might be a switch that stops electricity from flowing to an electric drive clutch 34 when a header height sensor 58 indicates a header has been lowered to below a specific height or when a header pressure switch 60 registers a particular pressure, in an embodiment like that of FIG. 10. Similarly, the controller 40 might turn the clutch 34 on and off based on readings of a hopper level sensor 62 (indicating the presence of seed over a particular level in the hopper 12) or a solid particle flow meter 64 (indicating the flow of material, like seeds through a particular portion of the device 10) in further embodiments.

Figure 5:
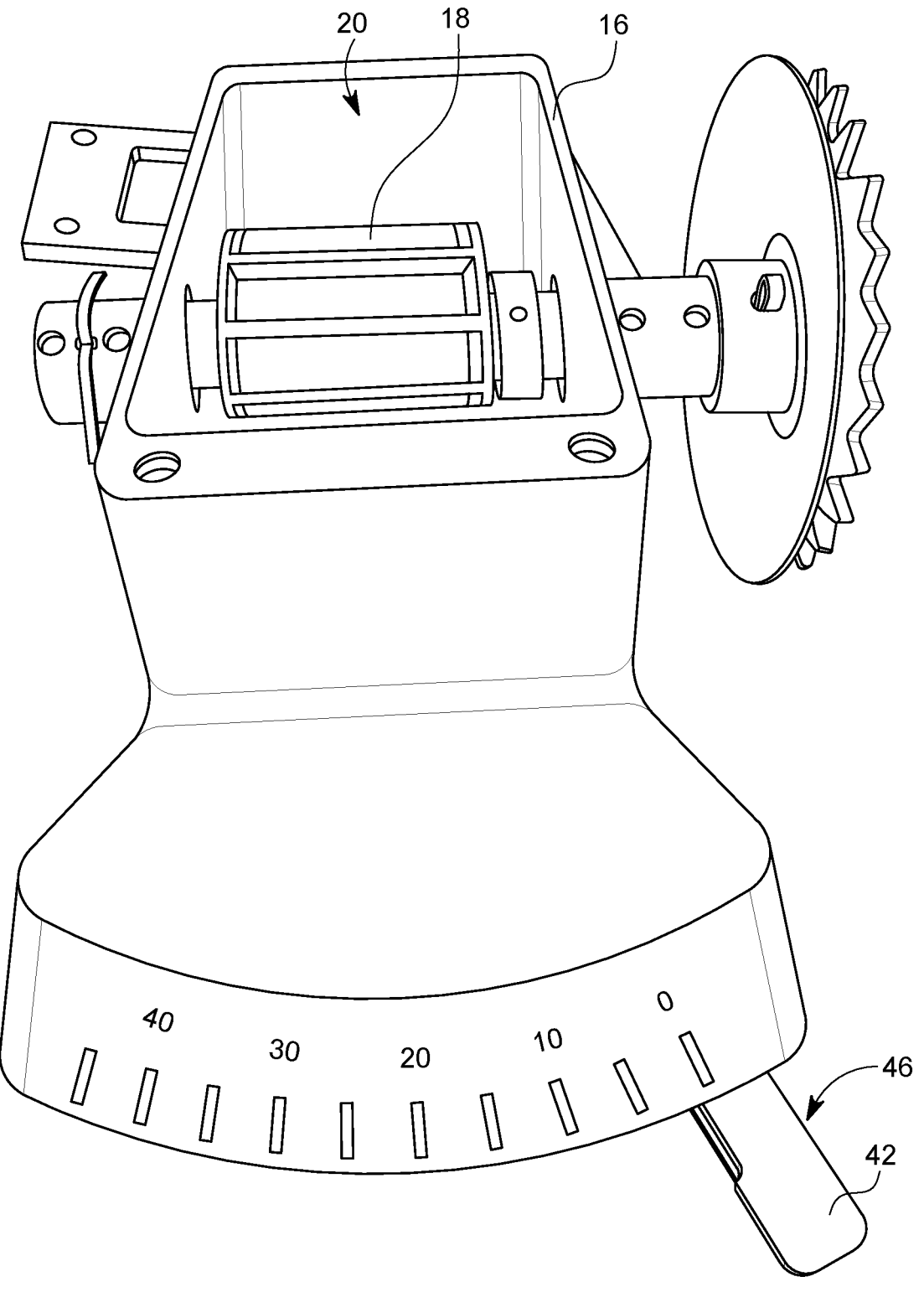
FIG. 5 illustrates a front view of metering device of a seed spreading device according to one or more embodiments having a control gate affixed to a bottom portion of the metering device.
Figure 6:
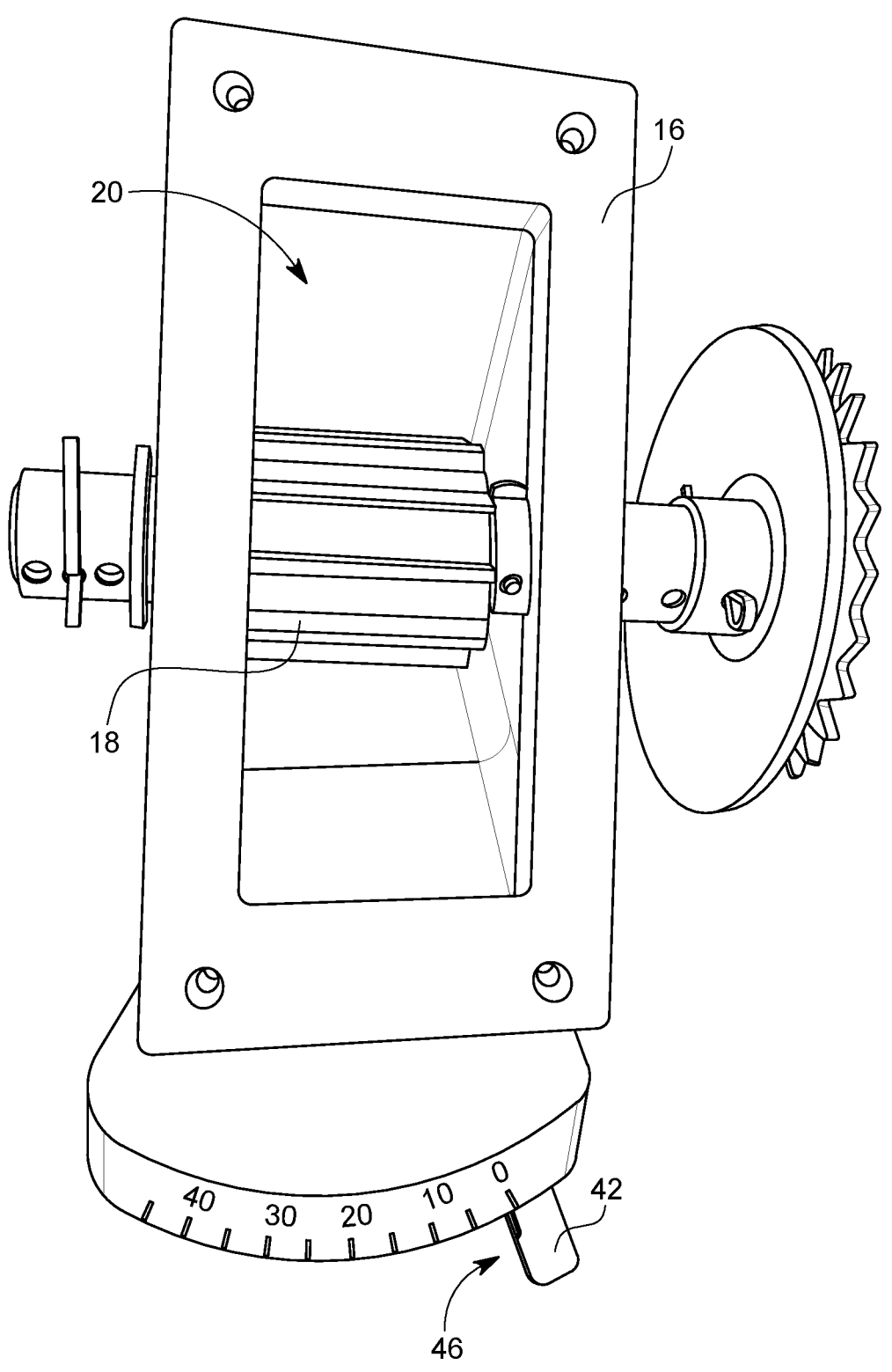
FIG. 6 illustrates a top view of a metering device of a seed spreading device according to one or more embodiments having a fluted roller delivery feeder seen through the first opening of the metering device.

In at least one embodiment, when the clutch 34 engages a connection between the first and second set of transmission linkages 36, both transmission linkages 36 move in a matched fashion and rotation generated by the motor 32 rotates a shaft connected to the metering device 16. In embodiments, the rotation of a shaft connected to the metering device 16 causes motion of an internal delivery feeder 18, such as a fluted feed roller (see FIGS. 5-6), to cause metered movement of seed from the hopper 12 to a guide tube 24 through a collector 48. The metered movement may be further regulated, in embodiments, by a control gate 42 at the exit 22 of the metering device 16. Once in the guide tube 24, seed is moved and deposited at some point proximate the residue distribution system 52 of the combine 50 to take advantage of that system to broadcast the seed during harvesting, as in FIGS. 3 and 4.

Figure 2:
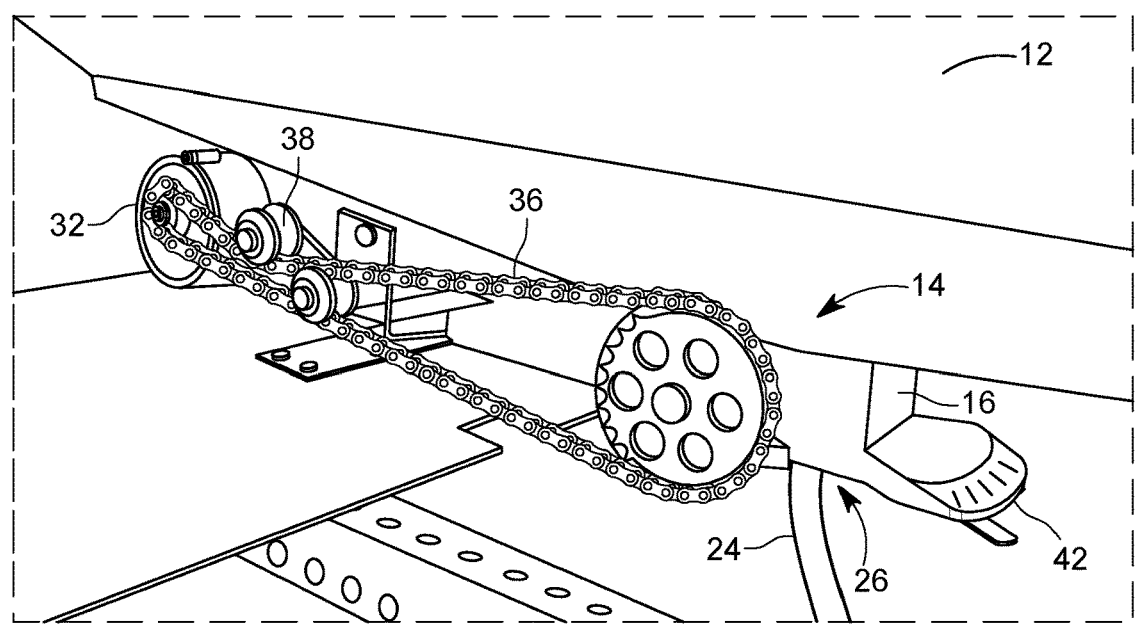
FIG. 2 illustrates a side view of a seed spreading device according to one or more embodiments that utilizes an electric motor and a tensioner.

As shown in FIG. 2, embodiments of the device comprise an electric drive motor 32 in mechanical communication with a metering device 16, a hopper 12 and control gate 42 affixed to opposite sides of a metering device 16, and a guide tube 24 having an end 26 affixed below the control gate 42 and another end 28 disposed at or near an inlet for the residue distribution system 52 of the combine 50. Thereby, various embodiments of the device 10 utilize an existing electric system and residue distribution system 52 of the combine 50 to broadcast seed.

Figure 9:
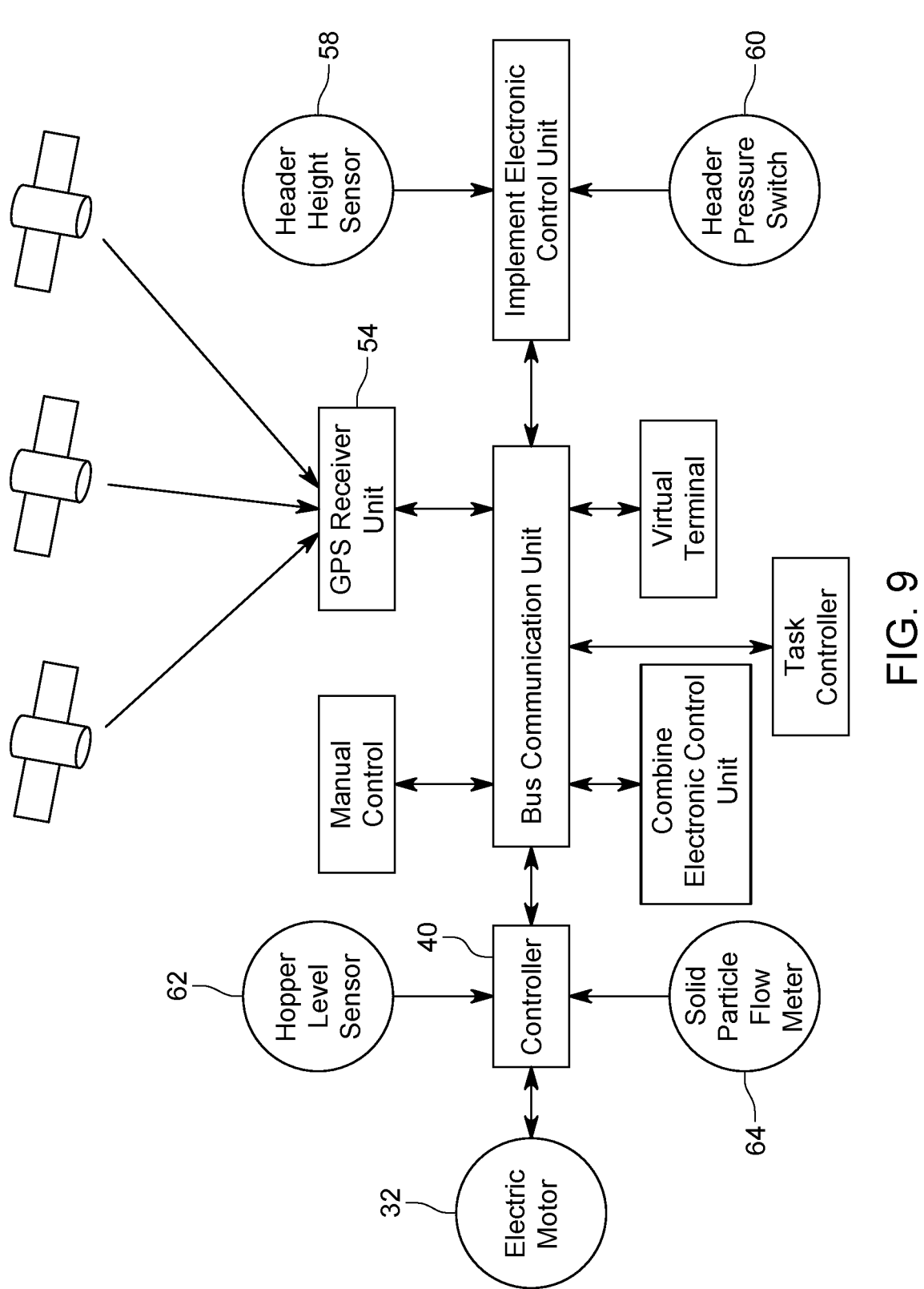
FIG. 9 illustrates a system diagram of a seed spreading device according to one or more embodiments having an electric motor.

In use, an electric motor 32 is tied into the electrical system of the combine 50 so that power may be supplied to the electric motor 32 and controlled by a controller 40, such as a dial and/or switch to control the speed thereof, in embodiments such as that of the system of FIG. 9. In embodiments, the rotational motion generated by the electric motor 32 rotates the shaft connected to a metering device 16, potentially through transmission linkages 36 or by a direct connection. In embodiments, rotation of a shaft connected to the metering device 16 causes motion of an internal delivery feeder 18, such as a fluted feed roller (see FIGS. 5-6), to cause metered movement of seed from the hopper 12 to a guide tube 24. Similarly, in embodiments, the metered movement may be further regulated by a control gate 42 at the exit 22 of the metering device 16. Once in the guide tube 24, seed is moved and deposited at some point proximate the residue distribution system 52 of the combine 50 to take advantage of that system to broadcast the seed during harvesting, as in FIGS. 3 and 4.

Elements

While various features and elements have been described in reference to particular embodiments and variations above, it is to be understood that no limitation of the scope of this disclosure is hereby intended. Thereby, elements and features might be utilized in any combination and for any embodiment to which it is particularly useful. For example, a clutch 34 might be utilized with an electric drive motor 32, should the variation thereof prove to be useful in a particular context. To further promote understanding of the principles of the present disclosure, additional discussion related to particular elements of the present discussion is provided below.

Hopper

In embodiments, the hopper 12, like that shown in FIGS. 1-4, provides storage for a volume of seeds intended to be broadcast. However, it is foreseen that other material might be placed in the hopper 12 and broadcast through the device 10. In various embodiments, the hopper 12 may be any shape, size, or capacity which allows for the storage of a volume of material and the attachment/integration of the device 10 with a particular combine 50. Indeed, in various embodiments, it is foreseen that the hopper 12 may be removably affixed to the metering device 16 and/or the combine 50 itself so that it can be replaced. In embodiments, the hopper 12, however, will generally be a hollow enclosure having an aperture to allow material to be deposited therein and another aperture 14 through which material can be deposited into an opening 20 of the metering device 16.

In embodiments, a hopper 12 may be constructed of materials such as metal, plastic, rubber, or other useful material. Indeed, in an embodiment, a hopper might even be constructed of or with wood. In certain embodiments, the hopper 12 may have a selectively engageable cap or lid for one or more of its apertures to enclosure or protect material placed in the hopper 12. For example, a lid on an opening of the hopper 12 can prevent water or other material from entering the hopper 12 and/or to secure and make the seed spreading device 10 safer during use. In embodiments, an opening of the hopper 12 might be blocked by a cover 12, such as a flexible tarp or rigid panel.

In certain embodiments, the hopper 12 may have one or more sensors to determine conditions within the hopper 12, such as the presence of material in the hopper 12 or the humidity level inside the hopper 12. In at least one embodiment, the hopper 12 has a level sensor 62 to indicate the presence of material up to a certain level in the hopper 12. The level sensor 62 may be of a contact or non-contact variety. Information from one or more sensors can be displayed to a user through displays in the cab of a combine 50 or affixed to portions of the seed spreading device 10 in various embodiments. The information also may be, in certain embodiments, utilized by a controller 40 operably connected to certain portions of the seed spreading device 10, such as in the system diagrams of FIGS. 9-11. In certain embodiments, the hopper 12 may include a light which is selectively operated based on information received from a sensor. For example, the hopper 12 may include a light which turns on when the hopper 12 is empty, to provide an indication to a user of the device. In further embodiments, the hopper 12 or a lid, cap, or cover, thereupon may include a light to provide illumination for visual inspection of the interior of the hopper 12.

Metering Device

In embodiments, the metering device 16 moves seed from the hopper 12 to the guide tube 24 in a regulated manner through rotation of a shaft connected to an internal delivery feeder 18. An embodiment of a metering device 16 is shown in FIGS. 5-8 and has a first opening 20, to accept material from the hopper 12, a second opening 22, through which material exits the metering device 16, and a delivery feeder 18, to move portions of the material form the hopper between the first opening 20 and the second opening 22. In embodiments, the delivery feeder 18 of the metering device 16 is a fluted feed roller. However, it is understood that the metering device 16 may be any type, material, size, shape, dimensions, or construction to achieve the above. Indeed, in various embodiments, the metering device 16 may be a fluted feed type, internal double run type, or a cup, cell, brush, picker wheel, star wheel, auger, or other type of metering device all of which have different internal delivery feeder 18 portions in embodiments. In various embodiments, the metering device 16 may have its own speed controls and sensors. Indeed, portions of the metering device 16 might include a solid particle flow meter 64 to determine the rate of the material being moved therethrough. Moreover, in at least one embodiment, the motor 32 may be integrated with the metering device 16, so the operative portion of the metering device 16, i.e., the delivery feeder 18, is operated by a directly connected shaft of the motor 32. Thereby, the seed spreading device may remove the necessity of various transmission linkages 36.

In further embodiments, the metering device 16 may be selectively adjustable to control the standard rate of material being moved through the metering device 16. Here, the rate is understood as the amount of material moved through the metering device 16 per unit of time or per operative motion of the metering device 16, such as revolutions of a delivery feeder 18. For example, in an embodiment, a fluted feed roller delivery feeder 18 may be adjustable to change the amount of material moved between the first opening 20 and second opening 22 per revolution of the fluted roller delivery feeder 18. Moreover, it is also foreseen that the metering device 16 may have additional adjustable internal portions which limit the flow of material to or from the delivery feeder 18 to control the standard rate of material therethrough.

Motor

In embodiments, the motor 32 provides motive force to drive portions of the metering device 16, such as an internal delivery feeder 18. In various embodiments, the motor 32 may be powered by an existing or separate system from those of the original manufactured combine 50 in embodiments. For example, a motor 32 can be powered by an electric or hydraulic system 56 of the combine 50 in embodiments. Indeed, the device 10 might utilize a brushed 12$v$ DC motor 32 in at least one embodiment. In additional embodiments, operative power for the motor 32 may be derived from a source that is not hydraulic or electric. In various embodiments, the motor 32 may be one speed or variable regarding speed. In embodiments, a controller 40 directs the speed or operation of a motor 32, as in the system of FIG. 9. In various embodiments, the motor 32 might include sensors and/or gauges to read information related to the operation of the motor 32, including its speed. This information may be displayed to a user through displays in the cab of a combine 50 or affixed to portions of the seed spreading device 10 in various embodiments. The information also may be, in certain embodiments, utilized by a controller 40 having control over the operation of the seed spreading device. For example, an embodiment of the device 10 can have a motor 32 with sensors that indicate the work required to operate the motor 32 at a certain speed, or a change in the work required, and a controller 40 that utilizes information about the work required to determine whether to stop the motor 32. Indeed, in embodiments, the controller 40 may stop a motor 32 because the amount of work required to operate the motor 32 is above an upper limit (indicating damage could result from operating the motor 32) or the amount of work below a lower threshold (indicating that there may not be any more material passing through the metering device 16).

Clutch

Figure 3:
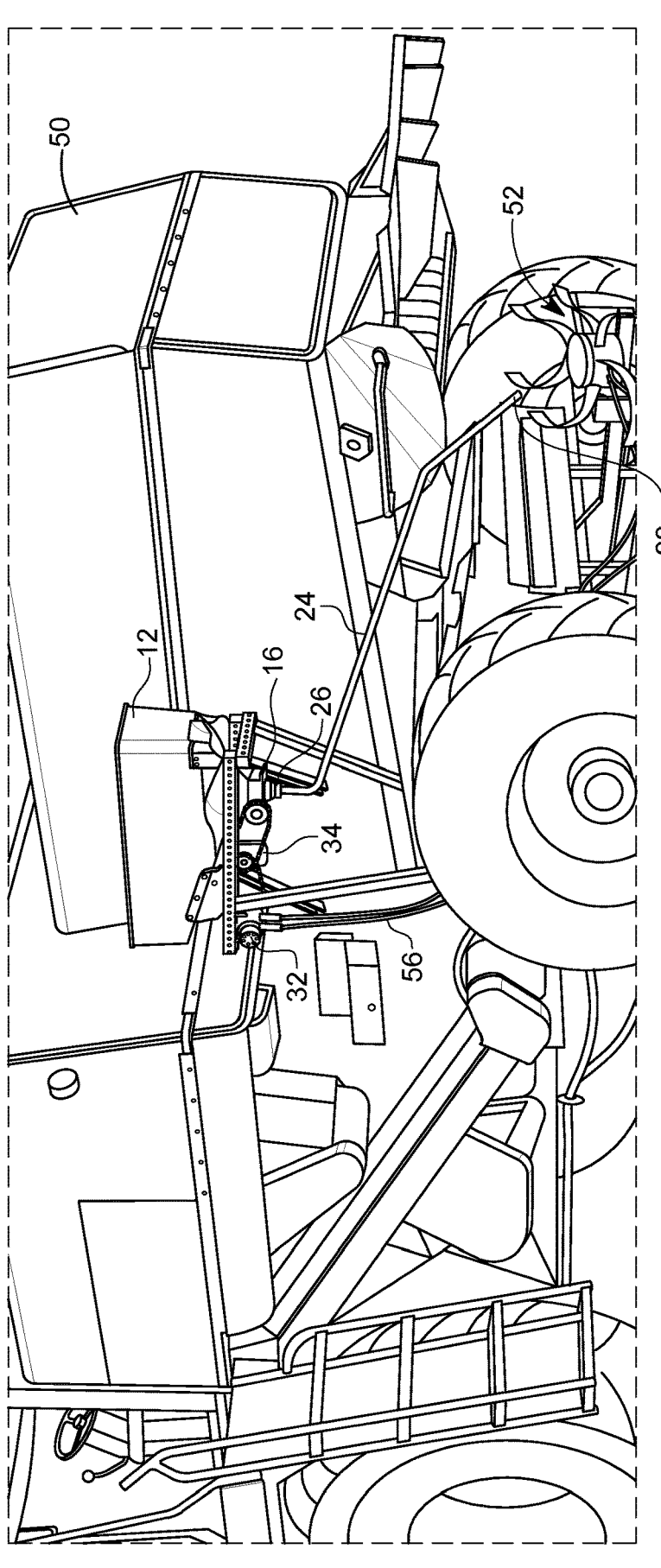
FIG. 3 illustrates a rear perspective view of a seed spreading device according to one or more embodiments having a guide tube disposed to deposit seeds into the residue distribution system of a combine.

In embodiments, operation of the metering device 16 and its delivery feeder 18 is selectively regulated and/or controlled through a clutch 34, like that of FIGS. 1 and 3. Thereby, the clutch 34, in embodiments, permits the regulated and/or selective engagement of two operable systems so that force in one system, like the motor 32, is transmitted to the other, like the metering device 16. In embodiments, the clutch 34 is an electric drive clutch whereby the motor 32 and metering device 16 are not connected while the clutch 34 is part of a completed electrical circuit and connected when the electrical circuit is broken. While the term electric drive clutch is utilized herein and descriptions have been made relating to control via electronic means, it is also understood that in certain embodiments, the electric drive clutch may be replaced by any other clutch device having any other control means, such as a mechanical clutch controlled by a mechanical lever. Indeed, unless stated otherwise or impossible, embodiments described herein with regard to an electric clutch may be applied to any other type of clutch or device utilized for similar purposes as a clutch.

In various embodiments, the regulation of motion between the motor 32 and metering device 16 may be achieved by establishing a connection through the clutch 34 between elements transmitting motion, such as transmission linkages 36, so that motion in one set of transmission linkages 36 causes motion in another set of transmission linkages 36. In various embodiments, the clutch 34 may also include means to regulate the speed of one of the sets of transmission linkages 36 in relation to the other. For example, in embodiments involving a motor 32 incapable of varying its speed, it may be useful for the clutch 34 to regulate the speed of the transmission linkages 36 to affect the speed of the seed broadcasting. In additional embodiments, a clutch 34 may not be necessary. For example, in embodiments where the motor 32 allows for variable control independent of any other system, the clutch 34 might not add value. However, it is still understood that, in certain instances, it might be desirable to include a clutch 34 even in the above case so as to add an additional layer of control or when the clutch 34 might add some refinement to controlling the operating speed of the metering device 16.

Transmission Linkages

As shown in FIGS. 1-3, the device 10 may include one or more transmission linkages 36 to connect the motor 32 with the metering device 16 in embodiments. For example, a transmission linkage 36 may directly connect the motor 32 and the delivery feeder 18 of the metering device 16 as in FIGS. 2 and 4. Alternatively, transmission linkages 36 may connect the motor 32 and metering device 16 through a clutch 34 in embodiments, as in FIGS. 1 and 3. In embodiments, the transmission linkages 36 may engage rotating shafts affixed to the motor 32 and/or the metering device 16, as in FIGS. 1-3. For example, the transmission linkage 36 may comprise a chain with openings, like a roller chain, that engages teeth on a sprocket wheel affixed to an end of the rotating shafts. While certain embodiments of the transmission linkages 36 comprise a roller chain, it is understood that the transmission linkages 36 may take the form of a another type of chain, belt, rope, or the like. Additionally, while a sprocket is shown in FIGS. 1-3, it is understood that other structures can be utilized to facilitate engagement of the shaft and transmission linkages 36. For example, the shaft might define a groove or channel into which a belt type transmission linkage may fit in an embodiment. Additionally, the device 10 may further include one or more devices, like tensioner 48, to help keep the transmission linkages 36 from becoming dislodged, as in FIG. 2.

Control Gate

Figure 7:
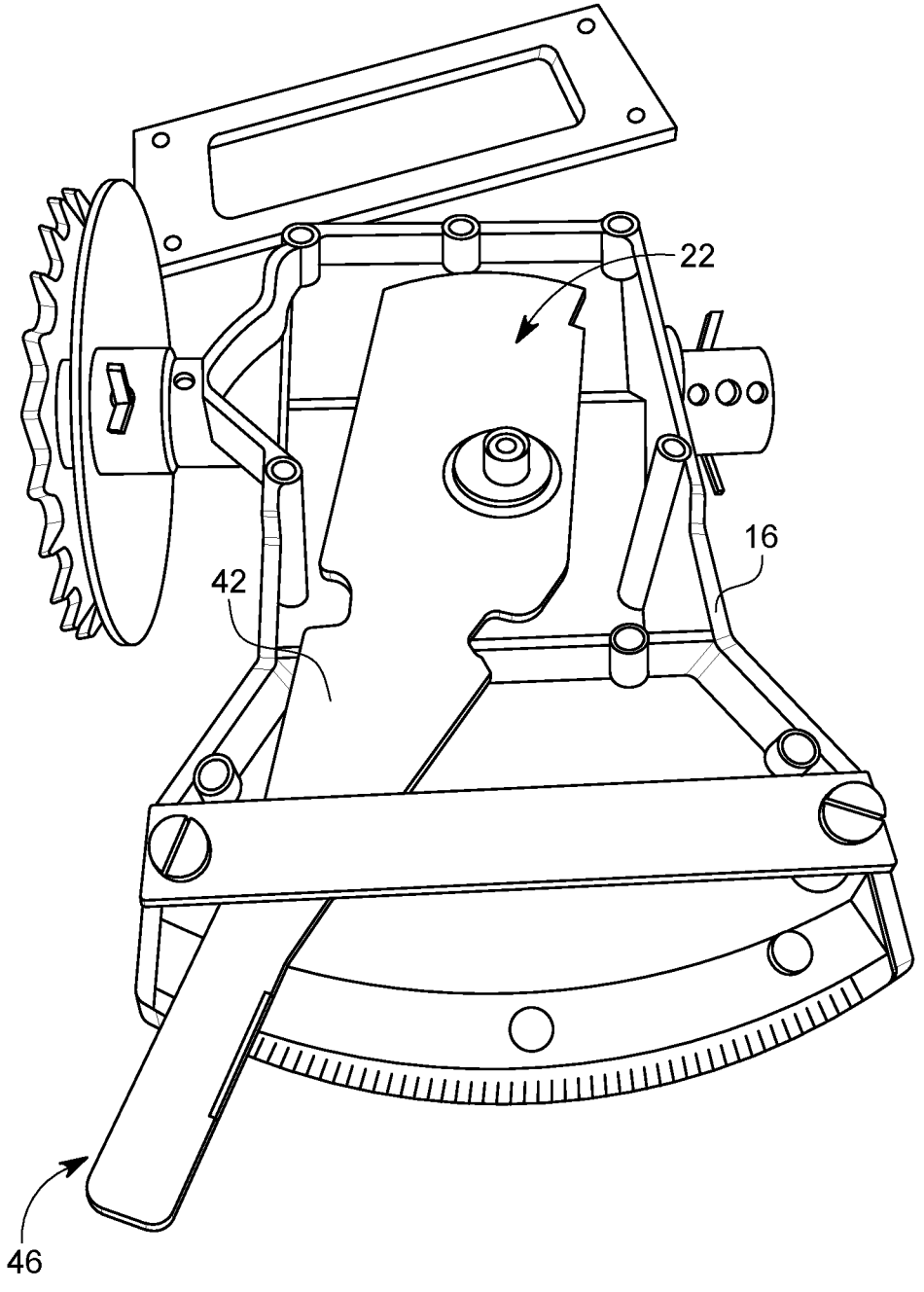
FIG. 7 illustrates a bottom view of a metering device of a seed spreading device according to one or more embodiments with the control gate affixed to the bottom of the metering device moved towards a closed position to cover the second opening of the metering device.
Figure 8:
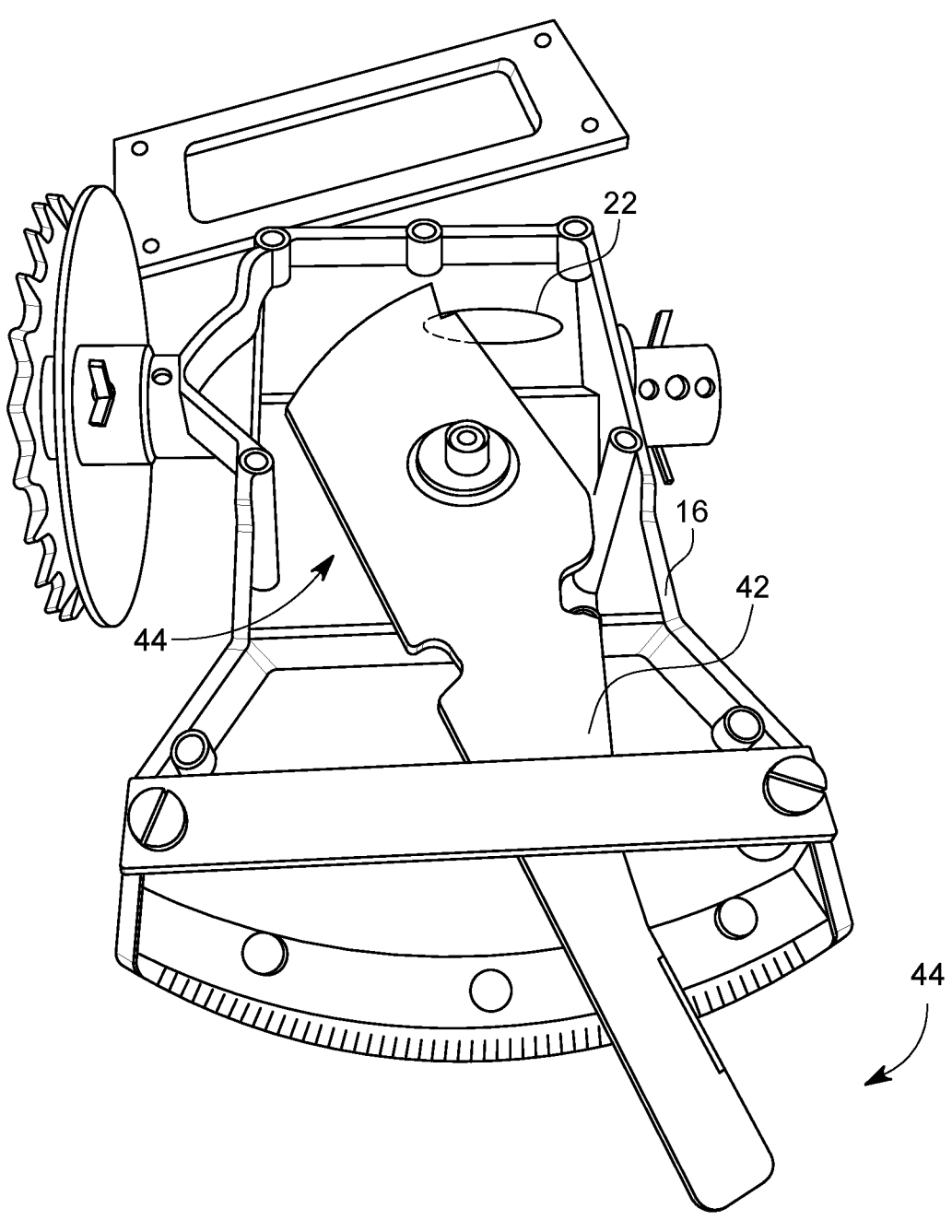
FIG. 8 illustrates a bottom view of a metering device of a seed spreading device according to one or more embodiments with the control gate affixed to the bottom of the metering device moved towards an open position to uncover a portion of the second opening of the metering device.

A control gate 42, in certain embodiments, may be utilized to regulate the flow of seed from the metering device 16 into or through the guide tube 24. In various embodiments, the control gate 42 comprises a plate which pivots or slides across the opening 22 at the exit end of the metering device 16 as shown in FIGS. 7 and 8. Indeed, the control gate 42 can move between a closed position 46, as in FIG. 7, and an open position 44, as in FIG. 8, in embodiments to wholly or partially cover or uncover opening 22 of the metering device 16.

In an additional embodiment, the control gate 16 can be disposed in a portion of the guide tube 24 to partially or fully block passage therethrough. Indeed, a control gate 42 can be disposed at or near the end 26 of the guide tube 24 disposed to accept material from the metering device 16 in one embodiment. In another embodiment, a control gate 42 can be disposed at or near the end 28 of the guide tube 24 disposed to insert material into the residue distribution system 52 of the combine 50. Moreover, a control gate 42 can be disposed along a portion of the guide tube 24 between the first end 26 and second end 28 in embodiments.

It is foreseen that the control gate 42 may be any size, shape, dimensions, construction, or type which might regulate the flow of seed into or through the guide tube 24. For example, a ball valve intersecting portions of the guide tube 24 may act as a control gate 42, in certain embodiments. Moreover, it is understood that a control gate 42 may not be necessary in certain embodiments. Additionally, it is also understood that a control gate 42 may be operated by a controller 40, such as in the system shown in FIG. 11. Indeed, in certain embodiments, the control gate 42 may be operably controlled or regulated by an electronic device located within the cab of a combine 50.

Guide Tube

Figure 4:
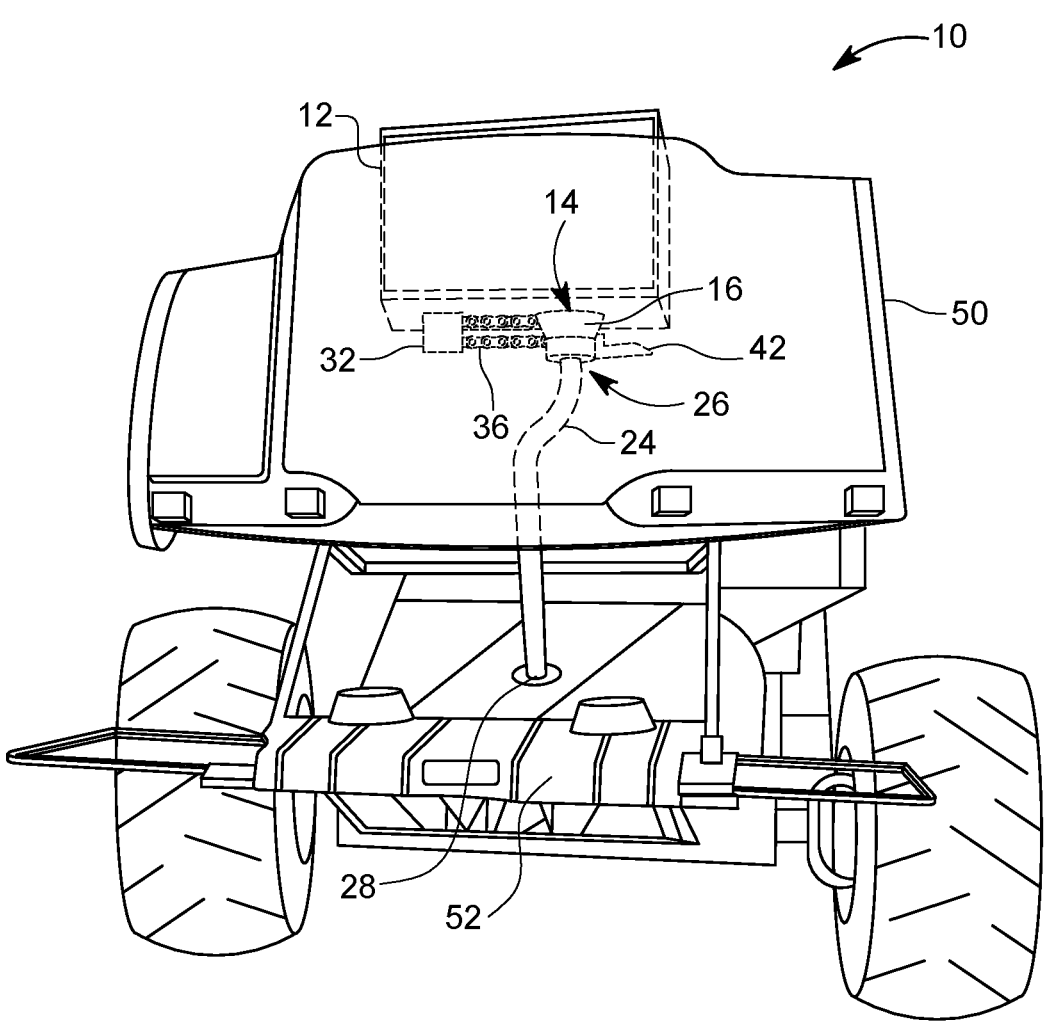
FIG. 4 illustrates a perspective view of a seed spreading device according to one or more embodiments having a guide tube disposed to deposit seeds into the residue distribution system of a combine.

In embodiments, the guide tube 24 accepts material, like seed, exiting the metering device 16 and directs it into the residue distribution system 52 of a combine 50, as in FIGS. 3 and 4. While the first end 26 of the guide tube 24 is disposed in proximity to the metering device 16 to accept material therefrom, the second end 28 of the guide tube 24 is disposed to insert, or deposit, material into the residue distribution system 52. As previously noted, the residue distribution system 52 comprises one or more various devices (such as impellers, blades, blowers, or the like) to broadcast residue, such as straw or chaff, out of the combine 50 during the harvesting process. In embodiments, portions of the residue distribution system 52 may be internal and/or external to a combine 50. Accordingly, in various embodiments, the second end 28 of the guide tube 24 can be disposed internally or externally to a combine 50. Moreover, the second end 28 may be disposed in a variety of locations relative to the residue distribution system 52 in embodiments. For example, the second end 28 may be disposed before any blades, impellers, or blowers, so that material, like cover crop seed, can enter the residue distribution system 52 along with residue to be dispersed in embodiments, as in FIG. 4. In an alternative embodiment, the second end 28 may be disposed at or after certain portions, like blades, impellers, or blowers, of the residue distribution system 52, as in FIG. 3. Further, in instances where a residue distribution system 52, or portion thereof, is separate and additional (such as an aftermarket addition to a combine 50), the second end 28 may be disposed to at or near the separate additional portion of the reside distribution system 52 so material can be inserted into and interact with such portion. In at least one embodiment, the guide tube 24 may be flexible, extendable, replaceable, or otherwise modifiable to accommodate adjustment of the placement of one or both of the first end 26 and second end 28 thereof. In further embodiments, the guide tube 24 may comprise branching sections so that material may be deposited into multiple sections of the residue distribution system 52. Indeed, in at least one embodiment, the guide tube 24 may comprise a diverter value to allow selective opening of one or more branches for material to pass therethrough.

The guide tube 24 may be any size, shape, or material sufficient for the purpose. Indeed, the diameter of the guide tube 24 may correlate with the size of material to be deposited into the residue distribution system 52 in embodiments. Moreover, the shape of the guide tube 24 (including whether it has a square, oval or circular cross-section) and the arrangement or path of the guide tube between the metering device 18 and the residue distribution system 52 may additionally facilitate the transport of material through the guide tube 24. In some embodiments, the guide tube 24 may also include sensors to provide information about the seed spreading device 10 or the conditions within the guide tube 24. For example, the guide tube 24 might have one or more sensors to determine the rate of seed passing through the guide tube 24 or the humidity within the guide tube 24. For example, a portion of the guide tube 24 might have a solid particle flow meter 64 in embodiments. Moreover, the guide tube 24 may further have one or more control gates 42 to regulate or control flow of material, as discussed previously. Additionally, the guide tube 24 may be removably mounted to one or more portions of the combine 50 through clamps, clips, or other connectors.

Collector

In embodiments, the collector 48, in certain embodiments, may be utilized to catch and direct material coming from the second opening 22 of the metering device 16 into an end 26 of the guide tube 24 as in FIGS. 1 and 3. In certain embodiments, the collector 48 may be press fit to the second opening 22 of the metering device 16 to allow for vibration and movement of the guide tube 24 relative to the metering device 16 without any weakening of the connection therebetween. It is also foreseen that the collector 48 may be constructed of any suitable material. In at least one embodiment, the collector 48 may comprise a flexible rubber-like material allowing a press fit connection with the metering device 16. In at least one embodiment, the collector 48 may be disposed below and completely unconnected to the metering device 16. It is foreseen that the collector 42 may be any shape or size, including that of a funnel which has a circumference, at its largest end, larger than the exit opening 22 of the metering device 16. In some embodiments, the collector 42 may have one or more sensors. For example, the collector 48 may comprise a solid particle flow meter 64 which determines the rate of material passing therethrough. In at least one embodiment, the guide tube 24 has no collector 48 and is affixed to or below a metering device 16 to accept material therefrom, as in FIG. 2.

Controller

Figure 10:
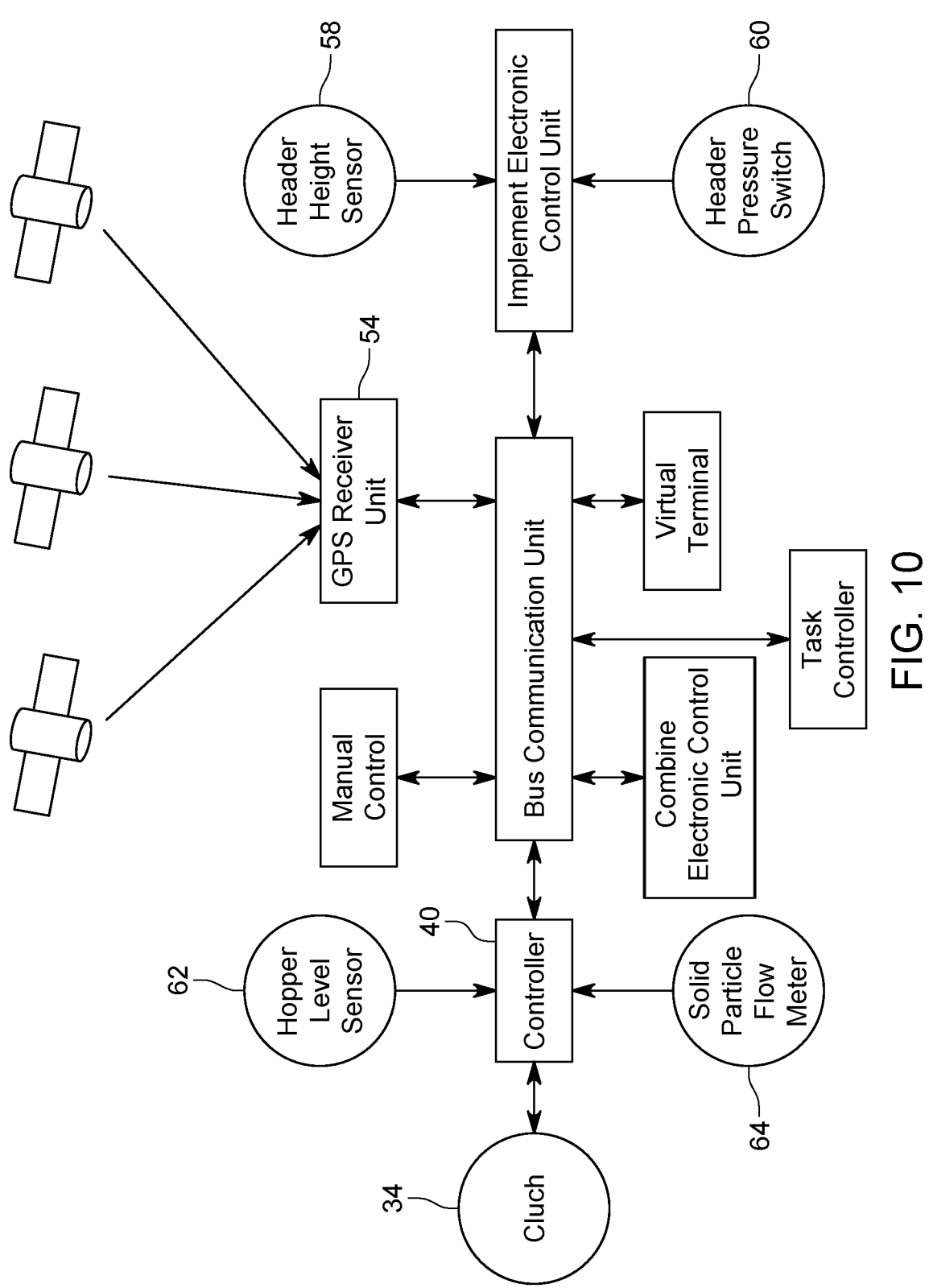
FIG. 10 illustrates a system diagram of a seed spreading device according to one or more embodiments having a clutch.
Figure 11:
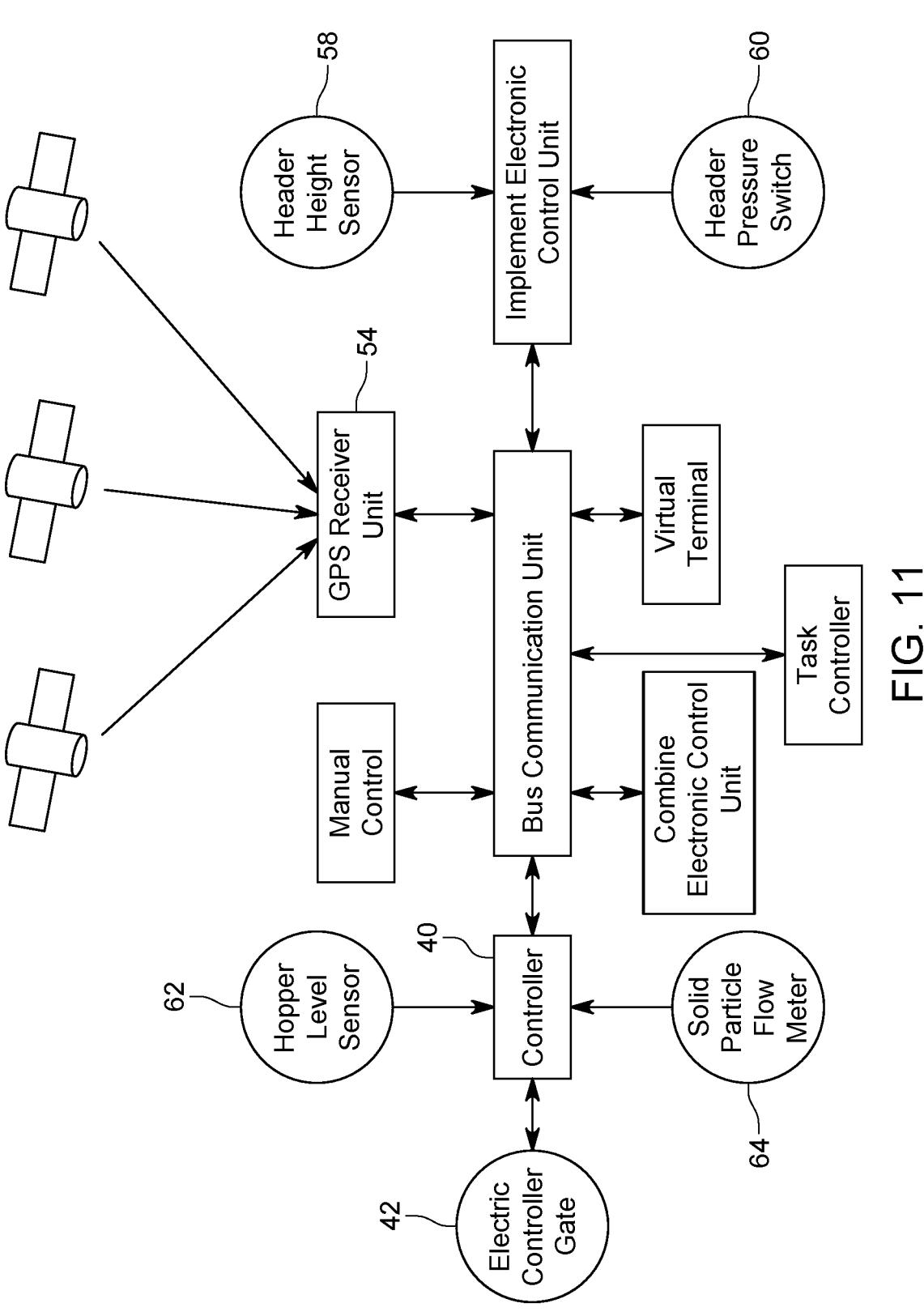
FIG. 11 illustrates a system diagram of a seed spreading device according to one or more embodiments having an electronic control gate.

As shown in the system diagrams of FIGS. 9-11, the rate of operation of the motor 32, control gate 42, or clutch 34 may be administered by the controller 40 directly or through an Bus Communication Unit in embodiments. In embodiments, a Bus Communication Unit provides a standardized communication unit to connect equipment in combines, and other agricultural equipment. In various embodiments, the Bus Communication Unit may be one associated with ISO Bus or CAN Bus. In embodiments, the controller 40 receives signals utilized to operate one or more portions of the device 10 based signals from sensors in direction connection with the controller 40 (like the hopper level sensor 62 or solid particle flow meter 64) or connected through a Bus Communication Unit (like the header pressure switch 60 or header height sensor 58). In additional embodiments, the controller 40 receives signals utilized to operate one or more portions of the device 10 based on signals from manual controls, such as manual or automatic switches, or computing devices connected thereto directly or through a Bus Communication Unit. In embodiments, a virtual terminal might be utilized to accept input resulting in signals being sent through the Bus Communication Unit to the controller 40.

GPS Unit

In various embodiments, a seed spreading device 10 also comprises a GPS system 54 capable of tracking the combine 50, recording travel history, and displaying travel data, including history, back to a user as in the system of FIGS. 9-11. In embodiments, the GPS system 54 may be tied to or activated along with the clutch 34 so that it records and, potentially, displays the travel history reflecting the area where material, like seed, has been broadcast as in FIG. 10. In further embodiments, the GPS system 54 may be tied directly to the controller 40 for the motor 32, so that the GPS system 54 operates, as above, in response to the motor 32 operating.

In one or more embodiments, the controller 40 for the motor 32 is tied to the GPS system 54 such that the motor 32 is turned on and/or speed is controlled based on data generated by the GPS system 54. In at least one embodiment, the GPS system 54 may be part of a larger electronic control system, such as being connected through a Bus Communication Unit, as in FIGS. 9-11. Accordingly, in embodiments data from the GPS system 54 might be utilized by the controller 40 to actuate the motor 32, as in FIG. 9, the clutch 34, as in FIG. 10, or the control gate 42, as in FIG. 11.

Computer System

In various embodiments, sensors, controls, and devices have been described which might be integrated into an overall system designed to enable operation of the seed spreading device 10, such as in FIGS. 9-11. For example, all the sensors in one embodiment of the device 10 might feed data to a computer system, like a virtual terminal, through a Bus Communication Unit to be displayed to a user and/or recorded for later retrieval. To achieve such a purpose and end, the computer system and other portions of the system might comprise processors, wiring arrays, memory, circuits, and programs associated with the operation of the sensors, the receipt of information therefrom, the control of various portions of the seed spreading device 10, and the recording and display of information to a user. Moreover, portions of the computer system may be integrated with a combine 50, such as by being a part of the combine's original manufacture or may be added separately, such as being added through an Bus Communication Unit.

Combine System Variations

In various embodiments, it is to be understood that one or all of the existing systems of the combine 50 utilized by the seed spreading device 10 might be replaced, in whole or part, by dedicated systems. For example, a separate hydraulic system 56 might be used and, potentially, fully dedicated to a hydraulic drive motor 32 of the seed spreading device 10. In an additional example, an electric drive motor 32 may receive power from a separate source than that of the electrical system utilized by portions of the combine 50. For example, batteries may be installed for and dedicated to powering the electric drive motor 32 in embodiments. Lastly, it is also foreseen that additional attachments relating to the residue distribution system 52 can be installed on or used with the combine 50 in embodiments. In embodiments utilizing additional attachments relating to the residue distribution system 52, it is foreseen that the guide tube 24 may deposit material exiting the guide tube 24 to rely on these additional attachments to broadcast the material.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that when an element or layer is referred to as being "on" another element or layer, the element or layer can be directly on another element or layer, or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below," "beneath," "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the present inventive subject matter. As used herein, the singular forms "a," "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced items. Although any methods, devices, and materials similar or equivalent to those described herein can be used in the practice or testing of the presently disclosed subject matter, representative methods, devices, and materials are now described.

In the drawings and specification, there have been disclosed typical preferred embodiments of the inventive subject matter and, although specific terms are employed, they are used in a generic and descriptive sense only and not for purposes of limitation, the scope of the inventive subject matter being set forth in the following claims.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A seed spreading device for use with a combine harvester comprising a residue distribution system, comprising:

a hopper enclosure comprising a first aperture;

a metering device comprising a delivery feeder disposed between a first opening and second opening, wherein the first opening is affixed in communication with the first aperture to accept material from the hopper;

a guide tube comprising a first end disposed proximate to the second opening of the metering device and a second end disposed in communication with the residue distribution system of the combine harvester, wherein a passage for material from the hopper is defined through the metering device and the guide tube;

a collector affixed to the first end of the guide tube, wherein a portion of the collector is disposed below the second opening of the metering device to funnel material from the metering device into the guide tube and wherein the collector is one of (i) flexible and press-fit to an end of the metering device or (ii) unconnected to the metering device but positioned to receive material falling from the second opening, such that the collector can allow friction, vibration, and movement between the guide tube and the metering device;

a control gate disposed below the second opening of the metering device between the second opening and the first end of the guide tube, wherein the control gate is configured to be selectively positionable in one of a closed position in which the control gate blocks flow from the metering device to the guide tube, a fully open position in which the control gate allows material to flow from the metering device to the guide tube, and one or more partially open positions in which the control gate allows material to flow from the metering device to the guide tube at a regulated flow rate; and a motor configured to operate the delivery feeder of the metering device and move a portion of the material from the hopper to the guide tube and wherein the guide tube is configured to deliver the material into the residue distribution system so that the material moved through the guide tube is broadcast by the residue distribution system.

2. The device of claim 1, wherein the motor comprises a hydraulic drive motor.

3. The device of claim 2, wherein the motor is operatively connected to a hydraulic system in the combine harvester.

4. The device of claim 2, wherein the motor is operatively connected to the delivery feeder through a clutch configured to selectively operate the delivery feeder.

5. The device of claim 4, wherein the motor is connected to the clutch through a first set of transmission linkages and the clutch is connected to the delivery feeder through a second set of transmission linkages.

6. The device of claim 4, wherein the clutch is in communication with a header height sensor to selectively operate the delivery feeder based on data from the header height sensor.

7. The device of claim 4, further comprising a GPS system in operative communication with the clutch, wherein the GPS system is configured to record data based on motion of the combine harvester selectively based on operation of the delivery feeder.

8. The device of claim 4, wherein the clutch is in operative communication with a GPS system configured to selectively operate the clutch based on data regarding the motion of the combine harvester.

9. The device of claim 1, wherein the motor comprises an electric drive motor.

10. The device of claim 9, further including a controller which is connected to the motor to operate the motor and, thereby, the delivery feeder.

11. The device of claim 10, wherein the controller is configured to selectively vary the speed of the motor and the rate of operation of the delivery feeder.

12. The device of claim 1, further comprising a GPS system in operative communication with the motor, wherein the GPS system is configured to record data regarding motion of the combine harvester selectively based on operation of the delivery feeder.

13. The device of claim 1, wherein the motor is in operative communication with a GPS system configured to selectively operate the motor based on data regarding the motion of the combine harvester.

14. The device of claim 1, wherein the motor is connected to the delivery feeder through transmission linkages.

15. The device of claim 1, further comprising a GPS system in operative communication with the control gate, wherein the GPS system is configured to record data regarding motion of the combine harvester selectively based on the position of the control gate.

16. The device of claim 1, wherein the control gate is in operative communication with a GPS system configured to selectively move the control gate between the open position and closed position based on data regarding the motion of the combine harvester.

* * * * *